US012754497B2

(12) United States Patent
Matsubara et al.

(10) Patent No.: US 12,754,497 B2
(45) Date of Patent: Oct. 6, 2026

(54) BELT TRANSPORT DEVICE, FIXING DEVICE, AND IMAGE FORMING APPARATUS

(71) Applicant: FUJIFILM Business Innovation Corp., Tokyo (JP)

(72) Inventors: Takashi Matsubara, Kanagawa (JP); Takashi Ohashi, Kanagawa (JP); Takuma Ishihara, Kanagawa (JP); Hina Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/181,047

(22) Filed: Mar. 9, 2023

(65) Prior Publication Data

US 2024/0101354 A1 Mar. 28, 2024

(30) Foreign Application Priority Data

Sep. 28, 2022 (JP) ................................ 2022-155014

(51) Int. Cl.

| | |
|---|---|
| ***G03G 15/20*** | (2006.01) |
| *B65G 39/16* | (2006.01) |
| *B65G 45/02* | (2006.01) |
| *G03G 15/00* | (2006.01) |

(52) U.S. Cl.

CPC ......... *G03G 15/2025* (2013.01); *B65G 39/16* (2013.01); *B65G 45/02* (2013.01); *G03G 15/6529* (2013.01); *G03G 2215/00139* (2013.01)

(58) Field of Classification Search

CPC .......... G03G 15/1615; G03G 15/2017; G03G 15/2025; G03G 15/2053; G03G 2215/00143

See application file for complete search history.

(56) References Cited

U.S. PATENT DOCUMENTS

| | | | | |
|---|---|---|---|---|
| 2007/0059064 A1* | 3/2007 | Okuda | ................ | G03G 15/206 399/329 |
| 2020/0218184 A1* | 7/2020 | Hongo | .............. | G03G 15/2025 |

FOREIGN PATENT DOCUMENTS

| | | |
|---|---|---|
| JP | 2007-79067 A | 3/2007 |
| JP | 2011-221516 A | 11/2011 |
| JP | 2013-83677 A | 5/2013 |
| JP | 2020-112593 A | 7/2020 |

OTHER PUBLICATIONS

Japanese Office Action in the Japanese application No. 2022-155014 dated Aug. 3, 2026.

* cited by examiner

*Primary Examiner* — Thomas S Giampaolo, II
(74) *Attorney, Agent, or Firm* — Sughrue Mion, PLLC

(57) ABSTRACT

A belt transport device includes an endless belt, multiple stretchers that stretch the belt, a corrector that displaces one of the multiple stretchers to correct a shift of the belt toward an edge portion of the belt in an axial direction of the belt, and a lubricant applicator that applies a lubricant to an inner surface of the belt at the edge portion of the belt in the axial direction when the belt has shifted toward the edge portion in the axial direction.

17 Claims, 9 Drawing Sheets

BELT TRANSPORT DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-155014 filed Sep. 28, 2022.

BACKGROUND

(i) Technical Field

The present disclosure relates to a belt transport device, a fixing device, and an image forming apparatus.

(ii) Related Art

For example, Japanese Unexamined Patent Application Publication No. 2013-83677 has described the technology relating to a fixing device.

Japanese Unexamined Patent Application Publication No. 2013-83677 describes a fixing device including an endless belt member and a lubricant applicator that applies a lubricant on an inner surface of the endless belt member. The lubricant applicator includes a lubricant application portion that applies the lubricant on the inner surface of the endless belt member, and lubricant recovery portions disposed at both edge portions of the lubricant application portion in a direction crossing a movement direction of the endless belt member to recover a lubricant from the inner surface of the endless belt member.

SUMMARY

Aspects of non-limiting embodiments of the present disclosure relate to a device that provides, regardless of when a belt has shifted to an edge portion in a direction crossing a movement direction of the belt, a lubricant onto an inner surface of the belt at the edge portion to which the belt has shifted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a belt transport device including an endless belt, stretchers that stretch the belt, a corrector that displaces one of the stretchers to correct a shift of the belt toward an edge portion of the belt in an axial direction of the belt, and a lubricant applicator that applies a lubricant to an inner surface of the belt at the edge portion of the belt in the axial direction when the belt has shifted toward the edge portion in the axial direction.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
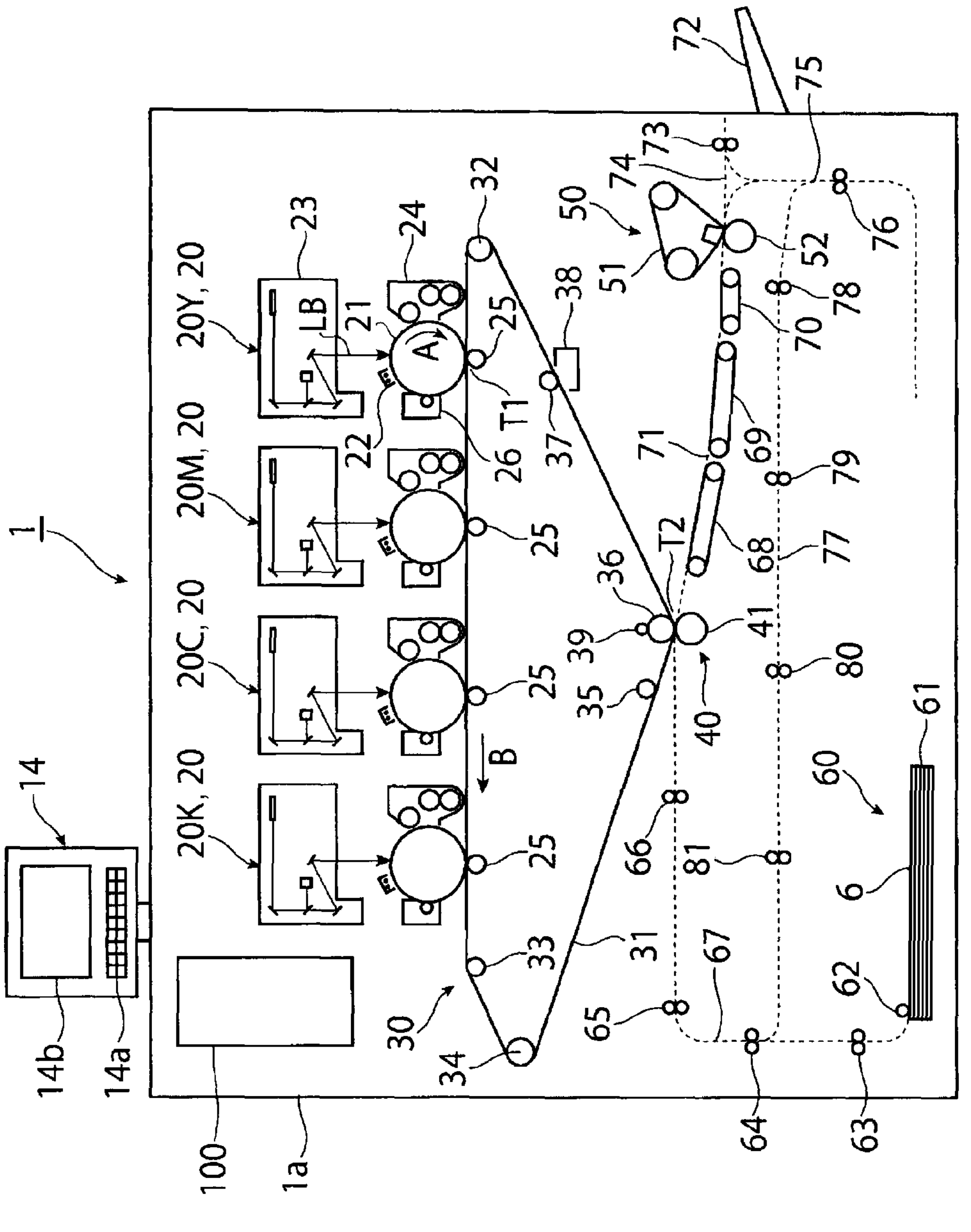
FIG. 1 is a diagram of the entire structure of an image forming apparatus to which a fixing device according to a first exemplary embodiment of the present disclosure is applied.

FIG. 1 is a diagram of the entire structure of an image forming apparatus including a belt transport device and a fixing device according to a first exemplary embodiment of the present disclosure.

Entire Structure of Image Forming Apparatus

An image forming apparatus 1 according to a first exemplary embodiment is formed as, for example, a color printer. As illustrated in FIG. 1, the image forming apparatus 1 includes components including multiple image forming devices 20 that form toner images developed with toner serving as a developer, an intermediate transfer device 30 that holds the toner images formed by the image forming devices 20 and finally transports the toner images to a second transfer position where the toner images are second-transferred to recording sheets 6 serving as an example of recording media (sheets), a sheet feeding device 60 that accommodates and transports the predetermined recording sheets 6 to be fed to the second transfer position of the intermediate transfer device 30, and a fixing device 50 serving as a fixing unit that fixes the toner image on each recording sheet 6 second-transferred by the intermediate transfer device 30 onto the recording sheet 6. An apparatus body 1*a* includes, for example, a support structure member and an outer cover.

In the first exemplary embodiment, the multiple image forming devices 20 and the intermediate transfer device 30 constitute an image forming unit that forms toner images on the recording sheets 6. Alternatively, the image forming unit may naturally include a single image forming device that directly forms a toner image on a recording medium without using the intermediate transfer device.

As illustrated in FIG. 1, the image forming apparatus 1 includes the four image forming devices 20 arranged in a line in the horizontal direction in the internal space of the apparatus body 1*a*. The four image forming devices 20 are image forming devices 20Y, 20M, 20C, and 20K that dedicatedly form color toner images corresponding to respective colors of yellow (Y), magenta (M), cyan (C), and black (K).

The image forming devices 20 (20Y, 20M, 20C, and 20K) basically have the same structure. Each of the image forming devices 20 (20Y, 20M, 20C, and 20K) includes components including a photoconductor drum 21 serving as an example of an image carrier that rotates in a direction indicated with arrow A, a charging device 22 that electrically charges, with a predetermined potential, the circumferential surface (the image holding surface) of the photoconductor drum 21 on which an image is formed, an exposure device 23 serving as an example of an exposure unit that forms an electrostatic image (for the corresponding color) having a potential difference by irradiating the electrically charged circumferential surface of the photoconductor drum 21 with a light beam LB based on information (a signal) of the image, a developing device 24 serving as a developing unit that develops the electrostatic image with toner in a developer of the corresponding color (Y, M, C, or K) into a toner image, a first transfer device 25 serving as an example of a first transfer unit that transfers each toner image to the intermediate transfer device 30, and a drum cleaning device 26 that cleans the photoconductor drum 21 by removing extraneous matter such as toner left on and adhering to the image holding surface of the photoconductor drum 21 after first transfer. Broken lines in the drawing indicate transport paths along which the recording sheets 6 are transported in the apparatus body 1*a*.

The intermediate transfer device 30 is disposed below the image forming devices 20 (20Y, 20M, 20C, and 20K). The intermediate transfer device 30 includes an intermediate transfer belt 31 that circularly moves in a direction of arrow B while passing through first transfer positions T1 located below the photoconductor drums 21 of the image forming devices 20 (20Y, 20M, 20C, and 20K). At the first transfer positions T1, the first transfer devices 25 (first transfer rollers) are in contact with the circumferential surfaces of the photoconductor drums 21 with the intermediate transfer belt 31 interposed therebetween. Each first transfer device 25 receives a first transfer bias voltage with a polarity opposite to the polarity of the toner image on the photoconductor drum 21 from a high voltage power supply not illustrated. The intermediate transfer belt 31 is circularly movably supported by multiple belt support rollers 32 to 37 on the inner circumference to be held in an intended state. Among the multiple belt support rollers 32 to 37, the belt support roller 32 serves as a driving roller, the belt support rollers 33 and 35 serve as driven rollers that hold the intermediate transfer belt 31 in, for example, the traveling position, the belt support roller 34 serves as a tensioning roller, the belt support roller 36 serves as a second-transfer back-up roller, and the belt support roller 37 serves as a support roller of a belt cleaning device 38.

A second transfer device 40 that second-transfers the toner images on the intermediate transfer belt 31 to the recording sheets 6 is disposed on the outer circumferential surface (the image holding surface) of the intermediate transfer belt 31 supported by the belt support roller 36. The second transfer device 40 is a contact transfer device including the belt support roller 36 that supports the intermediate transfer belt 31 at a second transfer position T2, and a second transfer roller 41 that rotates while being in contact with a portion of the outer circumferential surface of the intermediate transfer belt 31 supported by the belt support roller 36. In the first exemplary embodiment, the second transfer roller 41 is grounded. The belt support roller 36 receives a predetermined second transfer bias voltage with a negative polarity, the same as the polarity with which the toner is charged, from a high voltage power supply not illustrated through a bias application roller 39. The belt cleaning device 38 is disposed on the intermediate transfer belt 31 downstream from the second transfer device 40. The belt cleaning device 38 cleans the intermediate transfer belt 31 by removing extraneous matter such as toner or paper dust left on and adhering to the surface of the intermediate transfer belt 31. In the first exemplary embodiment, the second transfer roller 41 is grounded, and the belt support roller 36 receives a predetermined second transfer bias voltage with a negative polarity the same as the polarity with which toner is charged, but this structure is not the only possible example. Alternatively, the belt support roller 36 may be grounded, and the second transfer roller 41 may receive a predetermined second transfer bias voltage with a positive polarity opposite to the polarity with which toner is charged.

The fixing device 50 includes components such as a heating belt 51 that is heated by a heater (heat source) to keep the surface temperature at a predetermined temperature, and a pressing roller 52 that rotates while being in contact with the heating belt 51 with a predetermined pressure. In this fixing device 50, a contact portion where the heating belt 51 and the pressing roller 52 are in contact serves as a fixing nip where a predetermined fixing process (heating and pressing) is performed. The fixing device will be described below in detail.

The sheet feeding device 60 is disposed below the intermediate transfer device 30. The sheet feeding device 60 roughly includes one sheet container (or multiple sheet containers) 61 that accommodates a stack of recording sheets 6 of an intended size or an intended type, and a pick-up device 62 that picks up the recording sheets 6 one by one from the sheet container 61. The sheet container 61 is attached to be drawn out to, for example, the front of the apparatus body 1*a* (the side that a user faces when operating the image forming apparatus 1).

Examples of the recording sheets 6 include thin paper sheets including ordinary sheets or tracing paper sheets used for, for example, an electrophotographic copying machine or a printer, and overhead projector (OHP) sheets formed from transparent film media made of a synthetic resin (such as polyethylene terephthalate (PET)). To further improve the smoothness of the image surface that has undergone fixing, the surface of the recording sheet 6 is preferably as smooth as possible. For example, a coated paper sheet obtained by coating either one or both of the top and back surfaces of an ordinary sheet with resin or another material is preferably usable.

A fed-sheet transport path 67 is disposed between the sheet feeding device 60 and the second transfer device 40. The fed-sheet transport path 67 includes one or more pairs of sheet transport rollers 63 to 66 that transport the recording sheets 6 fed from the sheet feeding device 60 to the second transfer position T2, and a transport guide member not illustrated. The pair of sheet transport rollers 66 disposed at a position immediately in front of the second transfer position T2 on the fed-sheet transport path 67 serve as, for example, rollers (registration rollers) that adjust the timing to transport the recording sheets 6.

A sheet transport path 71 is disposed between the second transfer device 40 and the fixing device 50. The sheet transport path 71 includes multiple (or any one of) sheet transport belts 68, 69, and 70 that transport the recording sheets 6 fed from the second transfer device 40 to the fixing device 50.

A discharging transport path 74 is disposed downstream from the fixing device 50. The discharging transport path 74 includes sheet discharging rollers 73 that discharge the recording sheet 6 to which a toner image is fixed by the fixing device 50 to a sheet discharge portion 72 disposed on the side surface of the apparatus body 1*a*.

A reverse transport path 75 that allows the recording sheets 6 to be turned upside down diverges downward from a portion of the discharging transport path 74. A switching member not illustrated that switches the transport direction of the recording sheets 6 is disposed at the divergence point of the discharging transport path 74. A pair of reverse rollers 76 capable of switching the rotation direction between a forward rotation direction and a reverse rotation direction are disposed on the reverse transport path 75. A both-side transport path 77 that diverges leftward from a portion above the pair of reverse rollers 76 is connected with the reverse transport path 75. Multiple pairs of both-side transport rollers 78 to 81 that transport the upside-down recording sheets 6 to the fed-sheet transport path 67 and a transport guide member not illustrated are disposed on the both-side transport path 77.

FIG. 1 also illustrates a controller 100 serving as an example of a control unit that generally controls the operations of the image forming apparatus 1, and an operating device 14 that operates the image forming apparatus 1. The operating device 14 includes an operation panel 14*a* that receives inputs of the type of the recording sheets 6 or the number of recording sheets 6 to be recorded, and a display panel 14*b* that displays the inputs of the type of the recording sheets 6 or the number of recording sheets 6 to be recorded.

Operation of Image Forming Apparatus

A basic image forming operation performed by the image forming apparatus 1 will be described below.

An image forming operation performed to form a full-color image with a combination of four-color (Y, M, C, and K) toner images using the four image forming devices 20 (20Y, 20M, 20C, and 20K) will be described below.

When the image forming apparatus 1 receives request command information for an image forming operation (print) through the operating device 14, the controller 100 controls components including the four image forming devices 20 (20Y, 20M, 20C, and 20K), the intermediate transfer device 30, the second transfer device 40, the fixing device 50, and the sheet feeding device 60 to actuate the components.

In each of the image forming devices 20 (20Y, 20M, 20C, and 20K), the photoconductor drum 21 rotates in a direction of arrow A, and the charging device 22 electrically charges the surface of the photoconductor drum 21 with an intended polarity (a negative polarity in the first exemplary embodiment) and an intended potential. Subsequently, the exposure device 23 exposes the electrically charged surface of the photoconductor drum 21 with a light beam LB emitted based on an image signal obtained by converting image information input into the image forming apparatus 1 into a corresponding color component (Y, M, C, or K) to form, on the surface, an electrostatic image of the color component formed by a predetermined potential difference.

Subsequently, each of the developing devices 24 develops the electrostatic image of the color component formed on the photoconductor drum 21 by electrostatically adhering toner of the corresponding color (Y, M, C, or K) electrically charged with the intended polarity (negative polarity) to the electrostatic image. With this development, the electrostatic image of the color component formed on the photoconductor drum 21 is developed with toner of the corresponding color and formed into a toner image of any of four colors (Y, M, C, and K) as a visible image.

Subsequently, when the toner image of the corresponding color formed on the photoconductor drum 21 of each of the image forming devices 20 (20Y, 20M, 20C, and 20K) is transported to the first transfer position T1, the first transfer device 25 first-transfers the toner image of the corresponding color to sequentially overlap the toner image on the intermediate transfer belt 31 in the intermediate transfer device 30 that rotates in the direction of arrow B.

In each image forming device 20 that has finished first transfer, the drum cleaning device 26 scratches off extraneous matter to clean the surface of the photoconductor drum 21. Thus, each image forming device 20 is prepared for the next image forming operation.

Subsequently, the intermediate transfer device 30 holds the first-transferred toner image and transports the toner image to the second transfer position T2 with rotation of the intermediate transfer belt 31. The sheet feeding device 60 feeds an intended recording sheet 6 to the fed-sheet transport path 67 in accordance with the image forming operation. On the fed-sheet transport path 67, the pair of sheet transport rollers 66 serving as registration rollers feed the recording sheet 6 to the second transfer position T2 in accordance with transfer timing.

At the second transfer position T2, the second transfer roller 41 collectively second-transfers the toner images on the intermediate transfer belt 31 to the recording sheet 6. In the intermediate transfer device 30 that has finished second transfer, the belt cleaning device 38 removes extraneous matter such as toner left on the surface of the intermediate transfer belt 31 after second transfer to clean the intermediate transfer belt 31.

Subsequently, after being released from the intermediate transfer belt 31 and the second transfer roller 41, the recording sheet 6 to which the toner image is second-transferred is transported to the fixing device 50 by the sheet transport belts 68, 69, and 70. The fixing device 50 introduces the second-transferred recording sheet 6 into the fixing nip between the rotating heating belt 51 and the rotating pressing roller 52 to allow the recording sheet 6 to pass through the fixing nip to fix an unfixed toner image to the recording sheet 6 through a fixing process (heating and pressing).

The recording sheet 6 that has undergone the fixing process is discharged by the sheet discharging rollers 73 through the discharging transport path 74 to the sheet discharge portion 72 disposed on the side surface of the image forming apparatus 1.

When the image forming apparatus 1 is to form images on both surfaces of the recording sheet 6, a switching member not illustrated switches the transport path for the recording sheet 6 from the discharging transport path 74 to the reverse transport path 75 without the sheet discharging rollers 73 discharging the recording sheet 6 having an image on one surface to the sheet discharge portion 72. While the recording sheet 6 guided to the reverse transport path 75 has the trailing end held between the pair of reverse rollers 76, the pair of reverse rollers 76 have their rotation direction switched from the forward rotation direction to the reverse rotation direction to transport the recording sheet 6 to the both-side transport path 77 while the recording sheet 6 is turned upside down. The recording sheet 6 transported to the both-side transport path 77 is transported to the fed-sheet transport path 67 by multiple pairs of both-side transport rollers 78 to 81, and receives toner images on the back surface from the intermediate transfer belt 31. Thereafter, the recording sheet 6 is transported to the fixing device 50 to have the toner image transferred to the back surface fixed (heated and pressed) by the fixing device 50, and is then discharged to the sheet discharge portion 72 by the sheet discharging rollers 73 through the discharging transport path 74.

With the above operation, a full-color image formed with a combination of toner images of toner of the four colors (Y, M, C, and K) is formed on at least one of the surfaces of the recording sheet 6. When receiving a request command for performing the image forming operation for multiple sheets, the image forming apparatus 1 repeatedly performs the image forming operation for the multiple sheets in a similar manner. Besides forming a full-color image in the above manner, the image forming apparatus 1 also forms, on the recording sheet 6, an image with an appropriate combination of toner images of one to three colors including a monochrome image through the similar image forming operation by forming the toner images with one to three image forming devices.

Structure of Fixing Device

The image forming apparatus 1 with the above structure includes the fixing device 50 serving as an example of a fixing unit that fixes the image formed on the surface of the recording medium.

Figure 2:
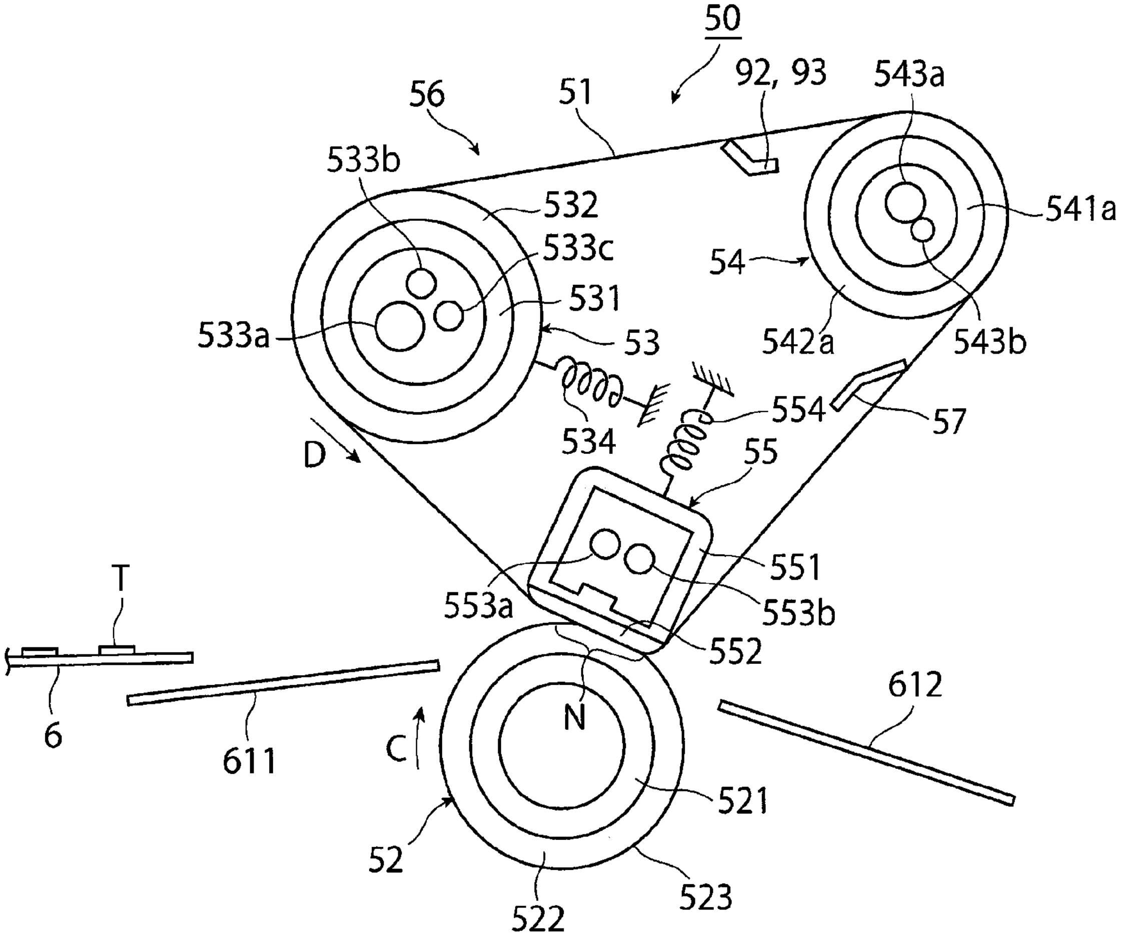
FIG. 2 is a diagram of the fixing device according to the first exemplary embodiment of the present disclosure.

As illustrated in FIG. 2, the fixing device 50 according to the first exemplary embodiment roughly includes the heating belt 51 serving as an example of an endless belt, and the pressing roller 52 serving as an example of a pressing member that comes into pressure contact with the heating belt 51. The heating belt 51 is rotatably (circularly movably) stretched with an intended tension around the outer circumferential surfaces of an internal heating roller 53 (a first stretching roller), a steering roller 54 (a second stretching roller) serving as an example of a corrector, and a pressing pad 55 (a pressing member). The internal heating roller 53, the steering roller 54, and the pressing pad 55 serve as examples of multiple stretchers disposed on the inner circumferential surface of the heating belt 51. The multiple stretchers are not limited to the above combination of the internal heating roller 53, the steering roller 54, and the pressing pad 55, but may be a combination of the internal heating roller 53 and the steering roller 54, or a combination of four or more stretchers including, for example, another internal heating roller, an external heating roller, or a stretching roller. The steering roller 54 corresponds to one of the multiple stretchers that is displaced to correct positional deviation of the heating belt 51. The heating belt 51, the internal heating roller 53, the steering roller 54 and the pressing pad 55 constitute a heating belt module 56 serving as an example of a belt transport device. Instead of the pressing pad 55, a rotatable roller may be used as a stretcher.

Figure 3:
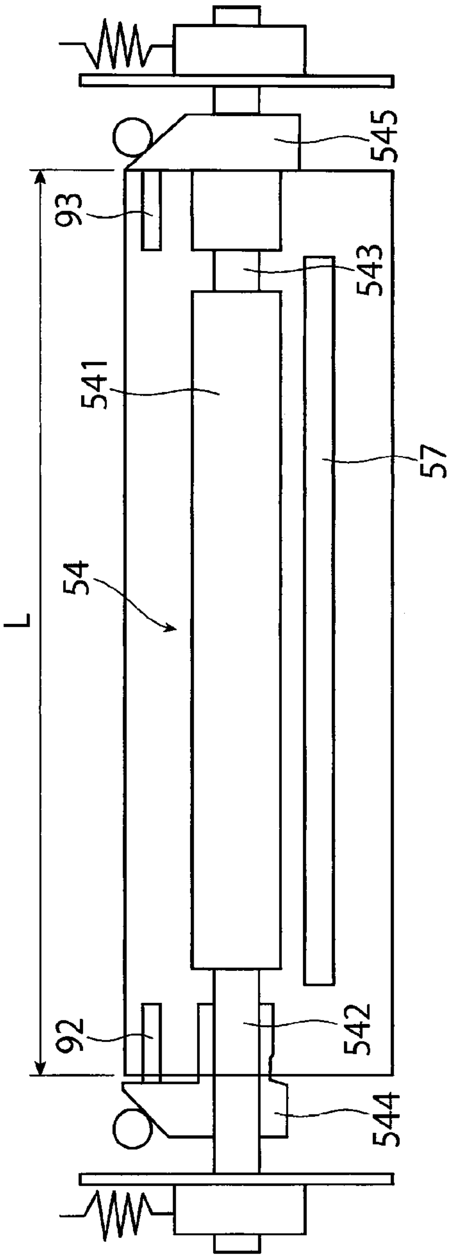
FIG. 3 is a diagram of a related portion of the fixing device according to the first exemplary embodiment of the present disclosure.

The heating belt module 56 includes a contact member 57 between the internal heating roller 53 and the steering roller 54. The contact member 57 is formed from, for example, a wick that comes into contact with the inner circumferential surface of the heating belt 51 to clean the inner circumferential surface and feeds a lubricant. Examples of the lubricant include silicone oil. As illustrated in FIG. 3, the contact member 57 has a dimension in the width direction (the axial direction of the steering roller 54), or a direction crossing the movement direction of the heating belt 51, shorter than the full width of the heating belt 51 by an intended dimension.

When the full width of the contact member 57 is equal to or slightly shorter than the dimension of the heating belt 51 in the width direction, and when a walking phenomenon in which the heating belt 51 shifts to an edge portion in the width direction occurs, an edge portion of the contact member 57 may be exposed from or located close to the edge portion of the heating belt 51, and the lubricant may transfer to the surface of the heating belt 51 and stain the recording sheet 6. The contact member 57 is thus shorter than the full width of the heating belt 51 to avoid this.

The heating belt 51 is a flexible endless belt. The heating belt 51 includes a base layer, an elastic layer coated on the surface of the base layer, and a surface layer coated on the surface of the elastic layer.

The base layer is formed from a thermoresistant synthetic resin such as a polyimide resin, a polyamide resin, or a polyamide-imide resin, or a metal such as stainless steel, nickel, or copper. The base layer preferably has a thickness of equal to or larger than 10 μm and equal to or smaller than 100 μm, more preferably, equal to or larger than 20 μm and equal to or smaller than 60 μm.

The elastic layer is formed from a thermoresistant elastic material such as silicone rubber or fluorocarbon rubber. The elastic layer preferably has a thickness of equal to or larger than 30 μm and equal to or smaller than 600 μm, more preferably, equal to or larger than 100 μm and equal to or smaller than 500 μm.

The surface layer is formed from a material such as perfluoroalkoxy alkanes (PFA) or polytetrafluoroethylene (PTFE). The surface layer preferably has a thickness of equal to or smaller than 100 μm, more preferably, equal to or larger than 5 μm and equal to or smaller than 50 μm, or particularly preferably, equal to or larger than 10 μm and equal to or smaller than 40 μm.

As appropriate, an adhesion layer not illustrated is interposed between the base layer and the elastic layer.

The heating belt 51 is in pressure contact with the pressing roller 52 at an area wound around the outer circumferential surface of the pressing pad 55. The pressure contact portion where the heating belt 51 and the pressing pad 55 are in pressure contact constitutes a fixing nip N through which the recording sheet 6 passes while holding the unfixed toner image T.

A planar first guide member 611 that guides the recording sheet 6 carrying the unfixed toner image T to the fixing nip N is disposed at the entrance of the fixing nip N in the direction in which the recording sheet 6 is transported. A planar second guide member 612 that guides the recording sheet 6 to which the unfixed toner image T is fixed to the outside of the fixing device 50 is disposed at the exit of the fixing nip N in the direction in which the recording sheet 6 is transported.

The exit of the fixing nip N has a recessed shape with respect to the surface of the pressing roller 52 to suddenly change the pressing force of the heating belt 51 to release, from the surface of the heating belt 51 using the stiffness of the recording sheet 6 and the curvature of the heating belt 51, the recording sheet 6 subjected to fixing at the fixing nip N where the heating belt 51 and the pressing pad 55 are in pressure contact.

A release support member such as a release pick not illustrated that forcefully releases the recording sheet 6 from the surface of the heating belt 51 may be disposed at the exit of the fixing nip N.

The internal heating roller 53 includes a hollow cylindrical core 531 formed from a metal such as stainless steel, aluminum, or iron (a thin-walled high strength steel pipe), and a coat layer 532 formed from, for example, a thermoresistant synthetic resin or a thermoresistant elastic material, such as thermoresistant silicone rubber or fluorocarbon rubber, coated on the outer circumferential surface of the core 531 with a uniform thickness. The internal heating roller 53 has its outer circumferential surface with a cylindrical shape. As appropriate, a release layer formed from, for example, perfluoroalkoxy alkanes (PFA) or polytetrafluoroethylene (PTFE) may be disposed on the surface of the coat layer 532 of the internal heating roller 53. Multiple (three in the illustrated example) halogen lamps 533*a*, 533*b*, and 533*c* are disposed as examples of heating units (heat sources) inside the internal heating roller 53. The three halogen lamps 533*a*, 533*b*, and 533*c* each have a heating area appropriately set in accordance with, for example, the size in the direction crossing the direction in which the recording sheet 6 is transported.

The internal heating roller 53 presses the heating belt 51 outward in the radial direction from the inside of the heating belt 51 using a first coil spring 534 serving as a first urging member to apply an intended tension to the heating belt 51.

As in the internal heating roller 53, the steering roller 54 includes a hollow cylindrical core 541*a* formed from a metal such as stainless steel, aluminum, or iron (a thin-walled high strength steel pipe), and a coat layer 542*a* formed from, for example, a thermoresistant synthetic resin or a thermoresistant elastic material, such as thermoresistant silicone rubber or fluorocarbon rubber, coated on the outer circumferential surface of the core 541*a* with a uniform thickness. The steering roller 54 has an outer circumferential surface with a cylindrical shape. As appropriate, a release layer formed from, for example, perfluoroalkoxy alkanes (PFA) or polytetrafluoroethylene (PTFE) may be disposed on the surface of the coat layer 542*a* of the steering roller 54. Multiple (two in the illustrated example) halogen lamps 543*a* and 543*b* are disposed as examples of heating units (heat sources) inside the steering roller 54. The two halogen lamps 543*a* and 543*b* each have a heating area appropriately set in accordance with, for example, the size in the direction crossing the direction in which the recording sheet 6 is transported. The steering roller 54 has a smaller outer diameter than the internal heating roller 53. The steering roller 54 may naturally exclude a heating unit (heat source) inside.

As illustrated in FIG. 2, the pressing pad 55 is formed from, for example, a stiff material such as aluminum, stainless steel, iron, or synthetic resin, and has a cross section with a substantially angular hollow or solid tube shape. The pressing pad 55 is integrally formed from, for example, a metal such as aluminum, stainless steel, or iron. However, the material of the pressing pad 55 is not limited to these, and may be a combination of two or more materials, such as a combination of metals including aluminum, stainless steel, and iron, or a combination of a synthetic resin and a metal such as aluminum, stainless steel, or iron. In the present exemplary embodiment, the pressing pad 55 includes a pad body 551 having a cross section of a substantially angular hollow tube and formed from a metal such as aluminum, stainless steel, or iron, and a pressing member 552 disposed on the pad body 551 to face the pressing roller 52.

The pressing member 552 is formed from a thermoresistant and stiff synthetic resin such as polyphenylenesulfide (PPS), polyimide, polyester, or polyamide, or a metal such as iron, aluminum, or stainless steel.

Multiple (two in the illustrated example) halogen lamps 553*a* and 553*b* are disposed as examples of heating units (heat sources) inside the pressing pad 55. The two halogen lamps 553*a* and 553*b* each have a heating area appropriately set in accordance with, for example, the size in the direction crossing the direction in which the recording sheet 6 is transported.

The pressing pad 55 presses the heating belt 51 with a second coil spring 554 serving as a second urging member with an intended pressing force against the outer circumferential surface of the pressing roller 52 from the inner side of the heating belt 51.

The internal heating roller 53, the steering roller 54, and the pressing pad 55 have their surface temperature detected by multiple temperature sensors not illustrated serving as examples of temperature detecting members. The internal heating roller 53, the steering roller 54, and the pressing pad 55 heat the surface of the heating belt 51 to an intended fixing temperature (for example, between 170° C. to 190° C.) by controlling the current fed to the halogen lamps 533*a*, 533*b*, and 533*c*, the halogen lamps 543*a* and 543*b*, and the halogen lamps 553*a* and 553*b* based on the detection results from the temperature sensors using a temperature control circuit including, for example, a triode AC switch (TRIAC) not illustrated.

The pressing roller 52 includes a hollow or solid cylindrical core 521 formed from a metal such as stainless steel, aluminum, or iron (a thin-walled high strength steel pipe), an elastic layer 522 formed from a thermoresistant elastic material such as silicone rubber or fluorocarbon rubber coated on the outer circumferential surface of the core 521, and a release layer 523 formed from, for example, perfluoroalkoxy alkanes (PFA) or polytetrafluoroethylene (PTFE) coated on the outer circumferential surface of the elastic layer.

The pressing roller 52 is rotatably supported by a frame of the fixing device 50 not illustrated with a bearing member interposed therebetween. The pressing roller 52 is driven to rotate in an arrow direction C by a driving member not illustrated. The pressing roller 52 is movable in a direction to be in contact with or away from the pressing pad 55 in the heating belt module 56 by a contact/separation member not illustrated.

While being in pressure contact with the outer circumferential surface of the pressing roller 52, the heating belt 51 is driven to rotate at a uniform speed in an arrow direction D with rotation of the pressing roller 52.

In the fixing device 50 with this structure, a walking phenomenon where the heating belt 51 shifts toward the edge portion in the direction crossing the movement direction of the heating belt 51 occurs due to various causes such as variation of the layer thickness of the heating belt 51, initial variation of the positional accuracy of the internal heating roller 53, the steering roller 54, and the pressing pad 55 that stretch the heating belt 51, and displacement of the internal heating roller 53, the steering roller 54, and the pressing pad 55 resulting from the temperature changes.

As illustrated in FIG. 3, the fixing device 50 according to the first exemplary embodiment includes a corrector that corrects, when the heating belt 51 causes a walking phenomenon, the walking phenomenon by tilting the steering roller 54 in a direction crossing the movement direction of the heating belt 51, to prevent the edge portion of the heating belt 51 in the width direction from coming into contact with a restricting member and being damaged.

As illustrated in FIGS. 2 and 3, the corrector includes the steering roller 54 constituting part of the corrector. The steering roller 54 has both edge portions in its axial direction supported to be movable in the direction crossing the movement direction of the heating belt 51.

Figure 4:
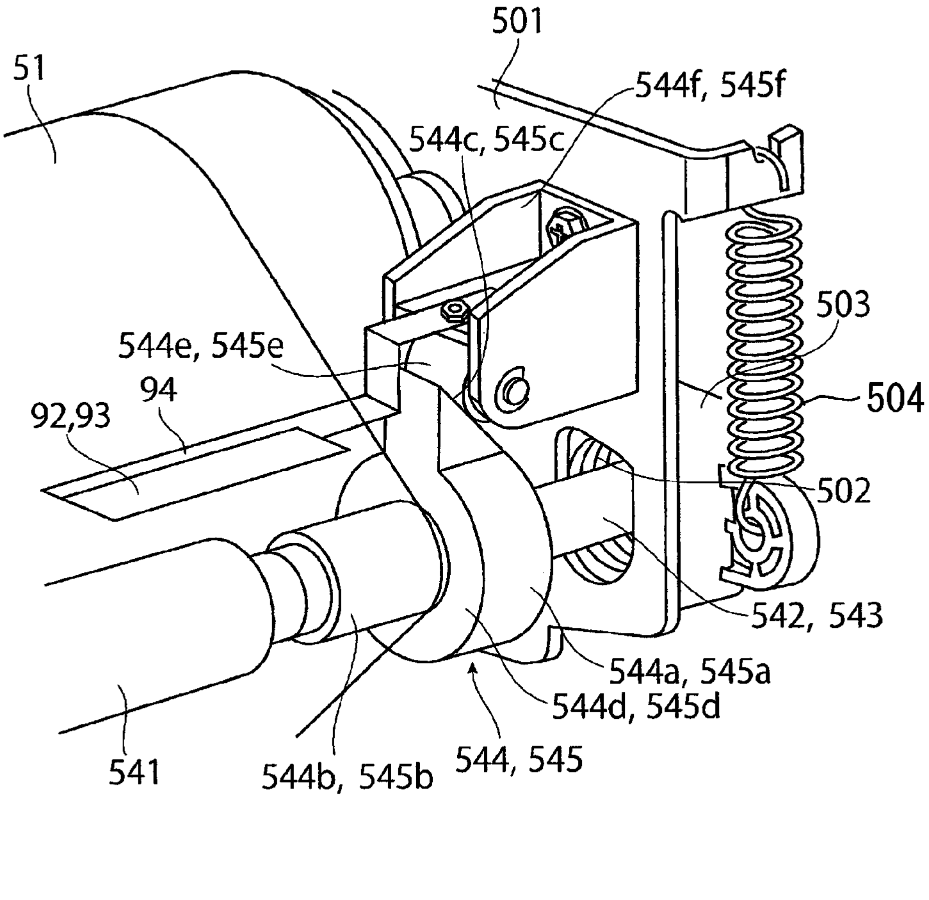
FIG. 4 is a perspective diagram of a related portion of the fixing device according to the first exemplary embodiment of the present disclosure.

As illustrated in FIGS. 3 and 4, the steering roller 54 includes a hollow or solid cylindrical tensioning portion 541 that stretches the heating belt 51, rotation shafts 542 and 543 that extend through the tensioning portion 541 or are unrotatably stopped at both edge portions in the longitudinal direction, and pulleys 544 and 545 separately disposed at both edge portions of the tensioning portion 541. A distance L between the inner end surfaces of the left and right pulleys 544 and 545 is equal to or larger than the dimension (width) of the heating belt 51 in the direction crossing the movement direction of the heating belt 51. The heating belt 51 is normally stretched while having its edge surfaces in the width direction in contact with or apart from the end surfaces of the pulleys 544 and 545. The pulleys 544 and 545 are respectively attached to the rotation shafts 542 and 543 in the steering roller 54 to keep the illustrated state while being independent from the rotation shafts 542 and 543, that is, without rotating together with the rotation shafts 542 and 543.

As illustrated in FIG. 4, the pulleys 544 and 545 are each formed from a metal or a rigid synthetic resin with a disc shape and an intended thickness. The pulleys 544 and 545 respectively include disc-shaped disc portions 544*a* and 545*a*, hollow cylindrical portions 544*b* and 545*b* disposed on the inner side of the disc portions 544*a* and 545*a* in the axial direction, inclined surface portions 544*c* and 545*c* disposed on the outer circumferential surfaces of the disc portions 544*a* and 545*a* to protrude outward in the radial direction and having a substantially triangular prism shape when viewed sideways, and end surfaces 544*d* and 545*d* disposed at the inner end portions of the pulleys 544 and 545 in the axial direction to be perpendicular to the rotation shafts 542 and 543 of the steering roller 54 and having a relatively large diameter. The end surfaces 544*d* and 545*d* of the pulleys 544 and 545 have outer diameters larger than the outer diameter of the tensioning portion 541 in the steering roller 54, and serve as flange portions with which the edge surfaces of the heating belt 51 come into contact. When the heating belt 51 shifts in the axial direction of the steering roller 54, the edge surfaces of the heating belt 51 come into contact with the end surfaces 544*d* and 545*d* of the pulleys 544 and 545 to push the pulleys 544 and 545. The inclined surfaces 544*c* and 545*c* of the pulleys 544 and 545 have an inclination angle with respect to the rotation shafts 542 and 543 of, for example, approximately 60 degrees, but the inclination angle may be smaller or approximately 30 to 45 degrees, or larger or approximately 70 to 80 degrees.

As illustrated in FIG. 4, rollers 544*e* and 545*e* that come into contact with the inclined surfaces 544*c* and 545*c* of the pulleys 544 and 545 are rotatably disposed on a body frame 501 of the fixing device 50 formed from, for example, a metal plate. The rollers 544*e* and 545*e* are rotatably disposed on support members 544*f* and 545*f* fixed to the body frame 501 in the fixing device 50.

The steering roller 54 is attached to the body frame 501 in the fixing device 50 to be movable in the direction crossing the movement direction of the heating belt 51 through long holes 502 in the body frame 501. The edge portions of the rotation shafts 542 and 543 in the steering roller 54 are rotatably supported by bearing members 503 disposed on the outer side of the body frame 501. The bearing members 503 are urged upward in the drawing by coil springs 504 each having one end portion coupled to the corresponding bearing member 503 to constantly bring the inclined surfaces 544*c* and 545*c* of the pulleys 544 and 545 into contact with the rollers 544*e* and 545*e*. The other end portion of each coil spring 504 is locked on the body frame 501.

Figure 5:
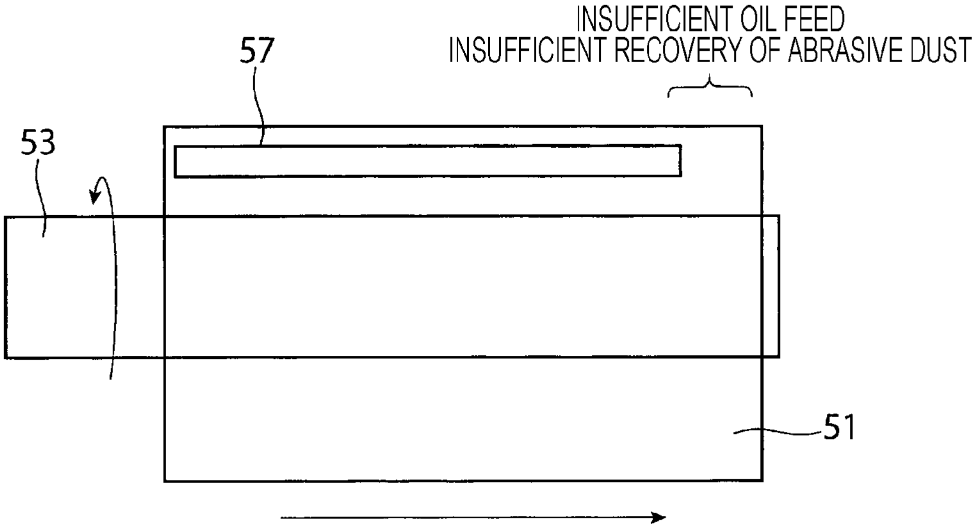
FIG. 5 is a schematic diagram of an existing fixing device.

When a walking phenomenon where the heating belt 51 shifts toward the edge portion in the axial direction of the steering roller 54 occurs, as illustrated in FIG. 5, the heating belt 51 shifts toward one edge portion in the width direction, and the edge portion of the heating belt 51 comes into contact with the end surface 544*d* or 545*d* of the pulley 544 or 545. When the heating belt 51 shifts further toward the edge portion in the width direction, the edge portion of the heating belt 51 pushes the pulley 544 or 545 outward in the axial direction.

Figure 6:
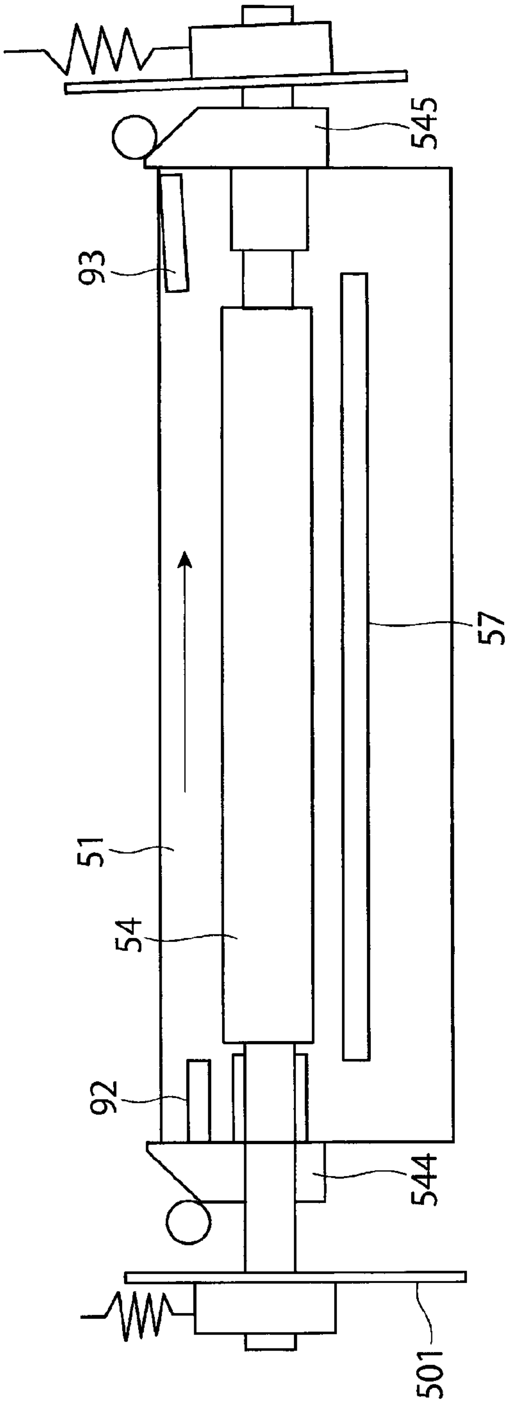
FIG. 6 is a diagram showing an operation of the fixing device according to the first exemplary embodiment of the present disclosure.

Then, the inclined surface portion 544*c* or 545*c* of the pulley 544 or 545 is pushed down by the roller 544*e* or 545*e* disposed closer to the body frame 501, and as illustrated in FIG. 6, the steering roller 54 is inclined to move a portion brought into contact with the edge portion of the heating belt 51 downward in the drawing with respect to the center portion in the axial direction. At this time, the other edge portion of the steering roller 54 moves opposite or upward in the drawing with respect to the center portion in the axial direction.

Thus, the heating belt 51 stretched by the steering roller 54 inclined downward in the drawing has a larger tension at the edge portion than at the center portion, and exerts a force of moving away from the edge portion in the width direction. Then, the heating belt 51 stops at the position where the force of moving toward the edge portion in the width direction is evenly balanced with the force of moving away from the edge portion in the width direction resulting from the inclination of the steering roller 54. Thus, the walking phenomenon caused in the heating belt 51 is avoided or reduced.

The position of the heating belt 51 where a walking phenomenon is avoided or reduced may be the position where the heating belt 51 is returned to the center portion in the axial direction or the position where the heating belt 51 has the edge portion left in contact with the end surface 544*d* or 545*d* of the pulley 544 or 545.

As illustrated in FIG. 2, the fixing device 50 with the above structure includes the contact member 57 that applies a lubricant to the inner surface of the heating belt 51. The contact member 57 is much shorter than the heating belt 51 in the width direction to prevent a lubricant fed by the contact member 57 from adhering to the edge portions of the heating belt 51 when the heating belt 51 causes a walking phenomenon. Thus, as illustrated in FIG. 5, when the heating belt 51 has caused a walking phenomenon, the lubricant is not supplied to the edge portions of the heating belt 51 by the contact member 57, and the shortage of the lubricant fed causes abrasion of the inner surface of the heating belt 51 at the edge portions and insufficient recovery of abrasion powder resulting from the abrasion.

The fixing device according to the first exemplary embodiment thus includes a lubricant applicator that applies a lubricant to the inner surface of the belt at the edge portions in the axial direction of the belts when the belt shifts toward one edge portion in the axial direction.

In the fixing device according to the first exemplary embodiment, the lubricant applicator is fixed to the apparatus body.

More specifically, as illustrated in FIG. 3 and FIG. 4, the fixing device 50 according to the first exemplary embodiment includes left and right edge portion wicks 92 and 93 at positions near the steering roller 54 and upstream or downstream of the heating belt 51 in the movement direction of the heating belt 51. The edge portion wicks 92 and 93 serve as examples of lubricant applicators that apply a lubricant to the inner surface of the heating belt 51 at edge portions in the axial direction. The edge portion wicks 92 and 93 are formed from a material such as a nonwoven fabric impregnated with a lubricant such as silicone oil.

As illustrated in FIG. 4, the left and right edge portion wicks 92 and 93 are disposed, by, for example, bonding, on metal sheets 94 fixed to the body frame 501 of the fixing device 50 serving as an example of a component installed on the apparatus body. Each metal sheet 94 has a base end portion folded in a crank shape and fixed by, for example, bonding or screwing on the support members 544*f* and 545*f*.

As illustrated in FIG. 3, the left and right edge portion wicks 92 and 93 are normally spaced apart from the inner surface of the heating belt 51 without being in contact with the inner surface of the heating belt 51.

As illustrated in FIG. 4, in contrast, when a walking phenomenon where the heating belt 51 shifts toward one edge portion in the width direction occurs, the left or right edge portion wick 92 or 93 comes into contact with the inner surface of the heating belt 51 near the edge portion as a result of the edge portion of the heating belt 51 where the walking phenomenon has occurred comes into contact with the end surface 544*d* or 545*d* of the pulley 544 or 545 in the steering roller 54 to push down the edge portion of the steering roller 54, and the heating belt 51 stretched by the steering roller 54 also shifts downward. The left and right edge portion wicks 92 and 93 that come into contact with the inner surface of the heating belt 51 are located at the positions where, while being into contact with the inner surface when a walking phenomenon where the heating belt 51 shifts toward one edge portion in the width direction occurs, the left and right edge portion wicks 92 and 93 leave a predetermined margin for the edge portions of the heating belt 51 regardless of when the edge portions of the heating belt 51 come into contact with the end surfaces 544*d* and 545*d* of the pulleys 544 and 545 in the steering roller 54. Thus, the left and right edge portion wicks 92 and 93 do not allow the lubricant fed by the left and right edge portion wicks 92 and 93 to transfer to the surface of the heating belt 51 regardless of when a walking phenomenon occurs in the heating belt 51.

The fixing device according to the first exemplary embodiment with the above structure is capable of feeding, in the following manner, a lubricant to the inner surface of the belt at an edge portion to which the belt has moved regardless of when the belt has shifted toward the edge portion in the direction crossing the movement direction of the belt.

As illustrated in FIG. 3, the fixing device 50 according to the first exemplary embodiment normally feeds a lubricant to the inner surface of the heating belt 51 by bringing only the contact member 57 serving as a lubricant applicator into contact with the inner surface.

As illustrated in FIG. 6, in the fixing device 50 according to the first exemplary embodiment, when a walking phenomenon where the heating belt 51 shifts toward one edge portion in the width direction occurs, the edge portion of the heating belt 51 comes into contact with and pushes the end surface 544*d* or 545*d* of the pulley 544 or 545 in the steering roller 54 to tilt the rotation shafts 542 and 543 of the steering roller 54, and the left or right edge portion wick 92 or 93 feeds a lubricant to the inner surface of the heating belt 51 at the edge portion where the walking phenomenon has occurred.

Regardless of when a walking phenomenon occurs, the fixing device 50 feeds the lubricant to the inner surface of the heating belt 51 with the contact member 57 and the left or right edge portion wick 92 or 93. Thus, the fixing device 50 is capable of avoiding or reducing insufficient feed of the lubricant or insufficient recovery of abrasion powder resulting from the abrasion of the inner surface of the heating belt 51.

Second Exemplary Embodiment

Figure 7:
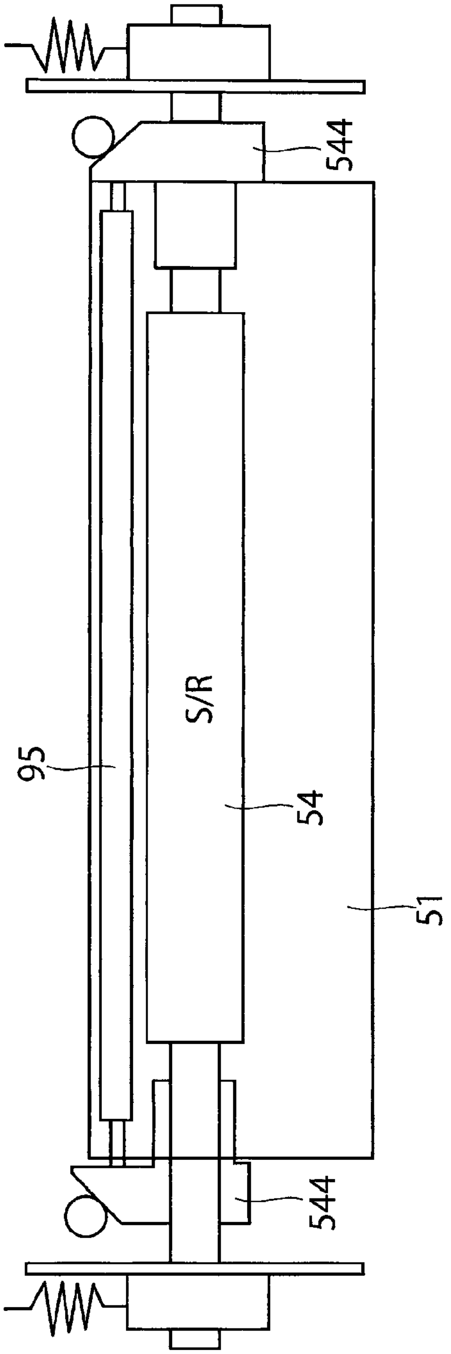
FIG. 7 is a diagram of a fixing device according to a second exemplary embodiment of the present disclosure.
Figure 8:
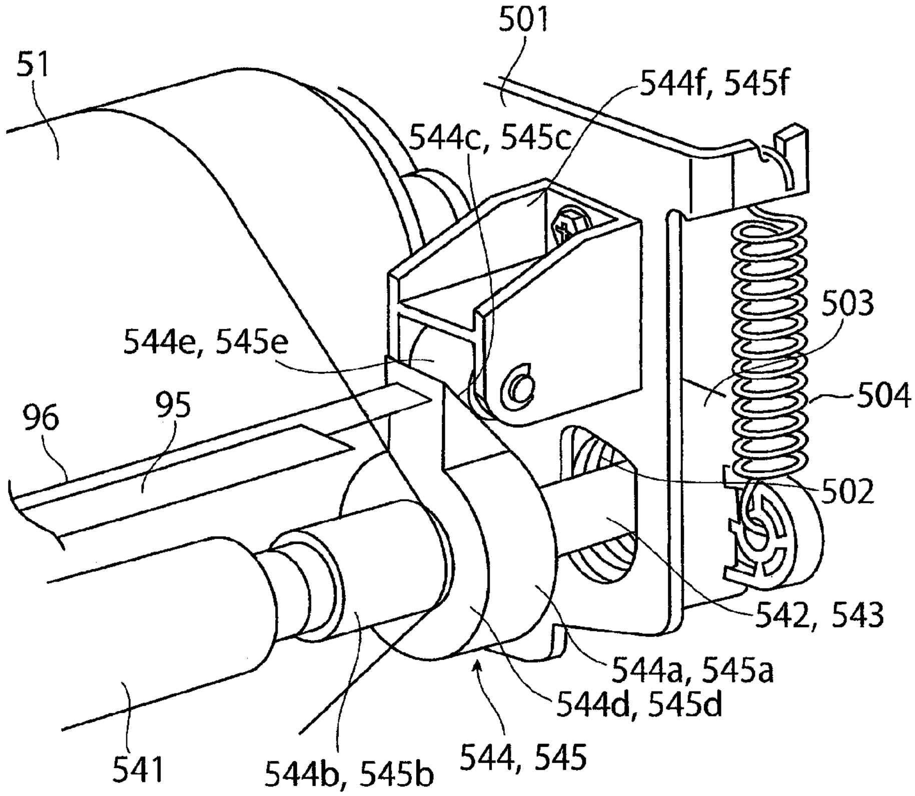
FIG. 8 is a perspective diagram of a related portion of the fixing device according to the second exemplary embodiment of the present disclosure.

FIG. 7 and FIG. 8 illustrate a fixing device according to a second exemplary embodiment of the present disclosure.

In the second exemplary embodiment, the lubricant applicator moves to the edge portion of the belt in the axial direction of the belt in accordance with the shift of the belt toward the edge portion in the axial direction.

In the second exemplary embodiment, the lubricant applicator is fixed to the corrector.

More specifically, as illustrated in FIG. 7 and FIG. 8, the fixing device 50 according to the second exemplary embodiment of the present disclosure includes only one contact member 95 serving as a lubricant applicator, instead of the contact member 57 and the edge portion wicks 92 and 93 serving as separate contact members serving as lubricant applicators.

As illustrated in FIG. 7 and FIG. 8, the contact member 95 is installed on a metal sheet 96 by, for example, bonding. Both end portions of the metal sheet 96 are fixed to the inner surfaces of the inclined surface portions 544*c* and 545*c* in the pulleys 544 and 545 in the steering roller 54. Both end portions of the metal sheet 96 are fixed to be bendable in accordance with the inclination of the pulleys 544 and 545 while being, for example, received in grooves formed in the inner surfaces of the inclined surface portions 544*c* and 545*c* in the pulleys 544 and 545. The grooves are not illustrated.

The dimension of the contact member 95 in the width direction of the heating belt 51 is shorter than the dimension of the heating belt 51 in the width direction, to leave, regardless of when a walking phenomenon where the heating belt 51 shifts toward one edge portion in the width direction occurs, a predetermined margin not to allow one edge portion of the contact member 95 to reach the corresponding edge portion of the heating belt 51. The contact member 95 is constantly in contact with the inner surface of the heating belt 51.

Figure 9:
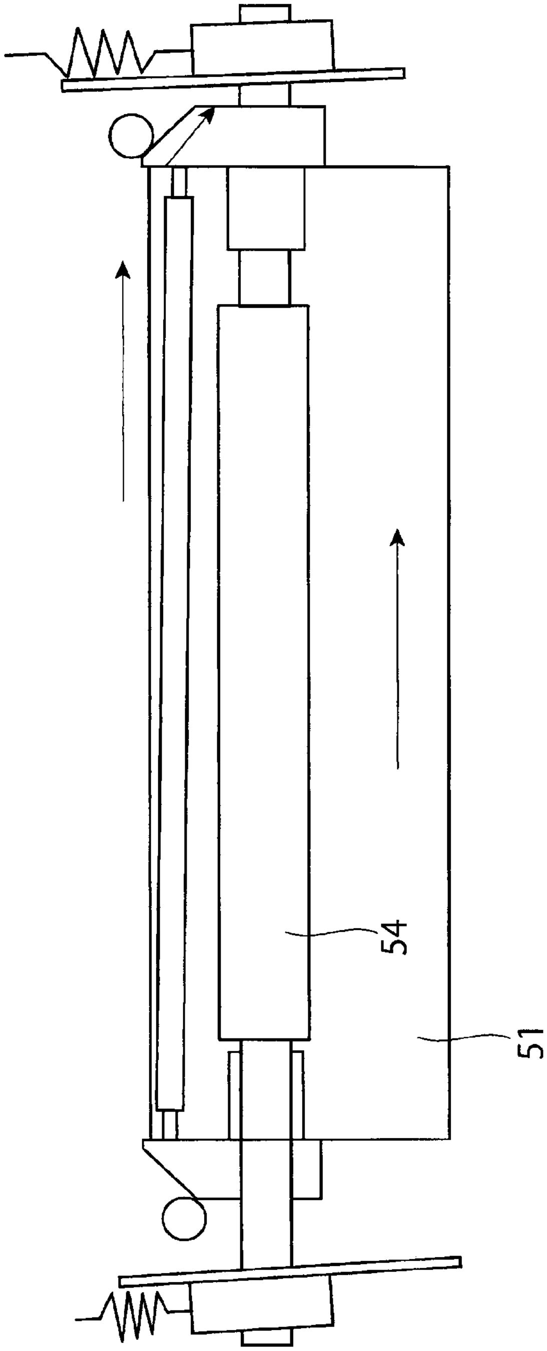
FIG. 9 is a diagram showing an operation of the fixing device according to the second exemplary embodiment of the present disclosure.

As illustrated in FIG. 9, in the fixing device 50 according to the second exemplary embodiment, when a walking phenomenon where the heating belt 51 shifts toward one edge portion in the width direction occurs, the edge portion of the heating belt 51 comes into contact with the pulley 544 or 545 in the steering roller 54 to tilt the steering roller 54.

At this time, the contact member 95 is fixed to the inner surfaces of the inclined surface portions 544*c* and 545*c* of the pulleys 544 and 545. Thus, when the steering roller 54 tilts, the contact member 95 is inclined with the tilted steering roller 54. Thus, the heating belt 51 moves in the tilting state together with the steering roller 54. The heating belt 51 stretched by the steering roller 54 moves while retaining substantially the uniform positional relationship with the steering roller 54. Thus, the contact member 95 having substantially the same positional relationship with the steering roller 54 keeps in contact with the inner surface of the heating belt 51 that has caused a walking phenomenon.

Thus, as illustrated in FIG. 9, in the fixing device 50 according to the second exemplary embodiment, the contact member 95 that keeps in contact with the inner surface of the heating belt 51 that has caused a walking phenomenon is capable of feeding a lubricant throughout the inner surface of the heating belt 51 at the edge portion in the width direction of the heating belt 51. FIG. 9 illustrates the contact member 95 that is in contact with the inner surface of the heating belt 51 that has shifted to the right edge portion in the width direction of the heating belt 51.

Thus, the contact member 95 supplies the lubricant to the inner surface of the heating belt 51 regardless of when a walking phenomenon occurs. Thus, the fixing device 50 is capable of avoiding or reducing insufficient feed of the lubricant or insufficient recovery of abrasion powder resulting from the abrasion of the inner surface of the heating belt 51.

Other components and operations are the same as those in the first exemplary embodiment, and thus are not described.

The exemplary embodiment has described a case where an unfixed toner image is to be fixed on a recording sheet, but this is not the only possible example. The present disclosure is naturally applicable to fixing of an object other than an unfixed toner image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A belt transport device comprising:
- an endless belt;
- a plurality of stretchers that stretch the belt;
- a corrector that displaces one of the plurality of stretchers to correct a shift of the belt toward an edge portion of the belt in an axial direction of the belt; and
- a lubricant applicator that applies a lubricant to an inner surface of the belt at the edge portion of the belt in the axial direction when the belt has shifted toward the edge portion in the axial direction.

(((2)))

The belt transport device according to (((1))), wherein, only when the belt has shifted toward the edge portion in the axial direction of the belt, the lubricant applicator comes into contact with the inner surface of the belt at the edge portion in the axial direction.

(((3)))

The belt transport device according to (((1))) or (((2))), wherein the lubricant applicator is fixed to an apparatus body of the belt transport device.

(((4)))

The belt transport device according to (((1))), wherein the lubricant applicator moves to the edge portion of the belt in the axial direction of the belt in accordance with a shift of the belt toward the edge portion in the axial direction of the belt.

(((5)))

The belt transport device according to (((4))), wherein the lubricant applicator is fixed to the corrector.

(((6)))

A fixing device, comprising:
- a belt transporter that transports an endless belt; and
- a fixing member that fixes a target to a recording medium using the endless belt transported by the belt transporter,
- wherein the belt transport device according to any one of (((1))) to (((5))) serves as the belt transporter.

(((7)))

An image forming apparatus, comprising:
- an image forming unit that forms an image on a surface of a recording medium; and
- a fixing unit that fixes the image formed on the surface of the recording medium,
- wherein the fixing device according to (((6))) serves as the fixing unit.

What is claimed is:

1. A belt transport device, comprising:
- an endless belt;
- a plurality of rollers provided inside the endless belt and configured to stretch the endless belt;
- a steering roller configured to be inclined to correct a shift of the endless belt toward an edge portion of the endless belt in an axial direction of the endless belt; and
- a wick member provided with lubricant and fixed to a support, the wick member configured to contact an inner surface of the endless belt at an edge portion in the axial direction only when the endless belt shifts toward the edge portion in the axial direction.

2. The belt transport device according to claim 1, wherein the wick member is fixed to an apparatus body of the belt transport device.

3. A fixing device, comprising:
- a belt transporter that transports an endless belt; and
- a fixing member that fixes a target to a recording medium using the endless belt transported by the belt transporter,
- wherein the belt transport device according to claim 2 serves as the belt transporter.

4. An image forming apparatus, comprising:
- an image forming unit that forms an image on a surface of a recording medium; and
- a fixing unit that fixes the image formed on the surface of the recording medium,
- wherein the fixing device according to claim 3 serves as the fixing unit.

5. The belt transport device according to claim 1, wherein the wick member is configured to move to the edge portion of the endless belt in the axial direction of the endless belt in accordance with a shift of the endless belt toward the edge portion in the axial direction of the endless belt.

6. The belt transport device according to claim 5, wherein the wick member is fixed to the steering roller.

7. A fixing device, comprising:
- a belt transporter that transports an endless belt; and
- a fixing member that fixes a target to a recording medium using the endless belt transported by the belt transporter,
- wherein the belt transport device according to claim 6 serves as the belt transporter.

8. An image forming apparatus, comprising:
- an image forming unit that forms an image on a surface of a recording medium; and
- a fixing unit that fixes the image formed on the surface of the recording medium,
- wherein the fixing device according to claim 7 serves as the fixing unit.

9. A fixing device, comprising:
- a belt transporter that transports an endless belt; and
- a fixing member that fixes a target to a recording medium using the endless belt transported by the belt transporter,
- wherein the belt transport device according to claim 5 serves as the belt transporter.

10. An image forming apparatus, comprising:
- an image forming unit that forms an image on a surface of a recording medium; and a fixing unit that fixes the image formed on the surface of the recording medium, wherein the fixing device according to claim 9 serves as the fixing unit.

11. A fixing device, comprising:

a belt transporter that transports an endless belt; and a fixing member that fixes a target to a recording medium using the endless belt transported by the belt transporter, wherein the belt transport device according to claim 1 serves as the belt transporter.

12. An image forming apparatus, comprising:

an image forming unit that forms an image on a surface of a recording medium; and a fixing unit that fixes the image formed on the surface of the recording medium, wherein the fixing device according to claim 6 serves as the fixing unit.

13. The belt transport device according to claim 1, the wick member comprises a plurality of wick member portions separated from each other.

14. The belt transport device according to claim 13, the plurality of wick member portions comprises a first edge portion wick member provided a first side and a second edge portion wick member provided at a second side.

15. A belt transport device, comprising:

an endless belt;

a plurality of stretching means for stretching the endless belt;

correcting means for displacing one of the plurality of stretching means to correct a shift of the endless belt toward an edge portion of the endless belt in an axial direction of the endless belt; and lubricant applying means for contacting and applying a lubricant to an inner surface of the endless belt at the edge portion of the endless belt in the axial direction only when the endless belt shifts toward the edge portion in the axial direction.

16. The belt transport device according to claim 15, the lubricant applying means comprises a plurality of wick member portions separated from each other.

17. The belt transport device according to claim 16, the plurality of wick member portions comprises a first edge portion wick member provided a first side and a second edge portion wick member provided at a second side.

* * * * *